United States Patent Office 2,852,525
Patented Sept. 16, 1958

2,852,525
NOVEL CHEMICAL COMPOUNDS

Siegfried Petersen, Ernst Tietze, and Wolfgang Wirth, Leverkusen-Bayerwerk, Germany, assignors to Schenley Industries, Inc., New York, N. Y., a corporation of Delaware No Drawing. Application November 23, 1956
Serial No. 623,827

Claims priority, application Germany November 26, 1955

5 Claims. (Cl. 260—308)

This invention relates generally to novel organic chemical compounds and, more particularly, it is concerned with certain novel condensation products of cyclic lactime-O-alkyl ethers with hydrazino-carboxylic or -thiocarboxylic acid esters, which, when cyclized, yield certain novel and useful compounds. The cyclized final products, for instance, may be used as analeptics, as central nervous system and respiratory system stimulants; and both the cyclized and uncyclized condensation products may be used as intermediates in synthesis of other pharmaceutical compounds, dyes, textile aids, pesticides and the like.

Examples of lactime ethers that may be used in practice of this invention are butyrolactime-O-alkyl ethers, valerolactime-O-alkyl ethers, caprolactime-O-alkyl ethers, caprylolactime-O-alkyl ethers, and caprinolactime-O-alkyl ethers, i. e. cyclic lactime ethers containing 5 to 10 carbon atoms. Cyclic lactime-O-alkyl ethers with heteroatoms in the ring in addition to the nitrogen atom of the lactime group may be used satisfactorily. As a rule, the methyl and ethyl ethers are used, but higher alkyl ethers, such as those described in German Patents 532,969 and 863,056, also may be employed.

These lactime-O-alkyl ethers react with hydrazino carboxylic acid esters under relatively mild conditions to form the desired condensation products. Generally the reaction proceeds between about 0° C. and 80° C.

The first step condensation of the lactime-O-alkyl ethers with the hydrazino carboxylic acid esters preferably is effected in an organic solvent reaction medium such as methanol, ethanol, propanol dioxane, tetrahydrofuran, or glycol monomethyl ether or its acetate. In this reaction, the alkoxy group of the lactime ether is exchanged against the hydrazide radical; in the specific instance of delta-valerolactime-O-alkyl ether, this process may be represented as follows:

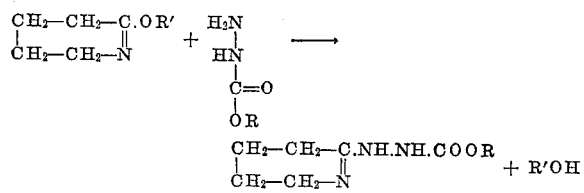

wherein R and R' each is an alkyl group, or aryl, especially a lower alkyl group. In the second stage of the process, which takes place especially readily with hydrazides of carboxylic acid lower alkyl esters, one mole of lower alcohol is abstracted from the condensation product and cyclization takes place as follows:

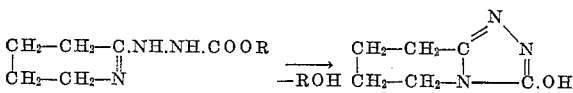

This reaction sometimes affords higher temperatures, say up to 180° C., but normally temperatures slightly elevated to room temperatures may be applied to accomplish this reaction.

The initial condensation reaction takes place readily under mild reaction conditions, i. e. relatively low reaction temperatures and short reaction periods; whereas use of higher temperatures and longer reaction periods favor further reaction to produce the cyclized products of the second step above described. Merely heating of the initial reaction mixture is sufficient to effect cyclization with elimination of one mole of an alcohol per mole of final product formed. Suitable reaction media for the second process step, in instances where the initial condensation product is isolated from the reaction mixture wherein it is formed, include glacial acetic acid and the like.

Regarded in certain of its broader aspects, the novel compositions of matter according to this invention are the compounds represented by the formula

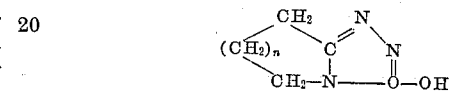

wherein n is a whole number from one to five.

These new compounds are readily obtained in pure, crystalline state. Being nitrogenous organic bases, they readily form salts with acids, for example, the simple mineral acids and the water-soluble, low molecular weight organic carboxylic acids. They are useful in chemotherapy as central nervous system and respiratory stimulants and, because of their analeptic properties, they may be used in shock therapy for treatment of mentally disturbed persons. They may be used, also, as intermediates in synthesis of other pharmaceutical preparations, dyes, textile aids, pesticides and the like.

The following examples may illustrate the invention.

Example 1

Synthesis of the compound represented by the formula:

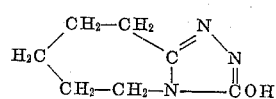

Equimolar proportions of caprolactime-O-methyl ether and ethyl hydrazine monocarboxylate are reacted at 20° C. in ethanol solution, forming an intermediate condensation product of the formula

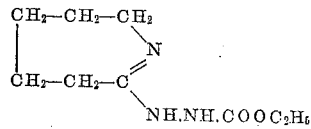

which melts at 121°–123° C. after being recrystallized from benzene-benzine.

This intermediate product is cyclized boiling for 24 hours in ethanol under reflux, giving a very good yield of the desired final product 3-hydroxy-4,5-pentamethylene-1,2,4-triazol, of the formula above set forth. This product, after recrystallization from ethanol, is found to melt at 182–183° C.

Example 2

Equimolecular amounts of δ-valerolactim-O-methyl ether and hydrazine monocarboxylic acid ethyl ester are reacted in a solution of ethyl alcohol for three hours at 20° C., then for 15 hours at the boiling temperature of ethyl alcohol. After distilling off the ethyl alcohol and the methyl alcohol in vacuo, a crystalline residue is obtained, which crystallizes well from 4 parts of glycol monomethyl ether acetate in colorless needles of the melting point 130–131° C. The 4,5-tetramethylene-3-hydroxy-1,2,4-triazol

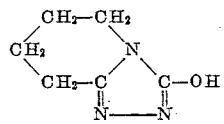

is obtained in a yield of 80% of theory. The compound is easily soluble in water. The pH-value of the solution is about 6.8. By addition of hydrochloric acid an easily soluble hydrochloride may be obtained, which readily crystallizes.

*Example 3*

Synthesis of the compound represented by the formula

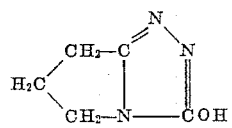

Substantially equimolecular proportions of ethyl hydrazinemonocarboxylate and gamma-butyrolactime-O-methyl ether

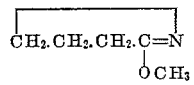

are reacted together in an ethanol reaction medium at a temperature of about 0°–10° C. Without isolation of the intermediate product the mixture is boiled for 15 hours. The final reaction product so obtained is recrystallized from ethanol. The melting point is 150°–151° C.

*Example 4*

31 parts by weight of capryl-lactim-O-methyl ether are slowly added at 20° C. to a solution consisting of 21 parts by weight of hydrazine monocarboxylic acid ester and 120 parts by weight of ethyl alcohol. Within 12 hours at room temperature the carbethoxy hydrazine of the melting point 131–132° C. is obtained, while methanol is split off. The carbethoxy hydrazine is refluxed for 16 hours with splitting off of ethanol and is thus converted to 4,5-heptamethylene-3-hydroxy-1,2,4-triazol of the formula

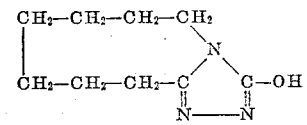

After recrystallizing from glycol monomethyl ethylacetate the reaction product melts at 112–113° C. The product is not easily soluble in cold water, while it readily dissolves in warm water. The pH-value of the aqueous solution is 6.5.

We claim:

1. As a novel composition of matter a chemical substance represented by the formula

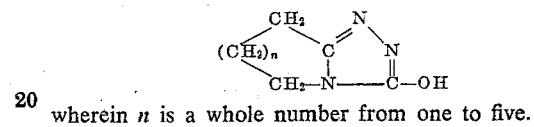

wherein $n$ is a whole number from one to five.

2.

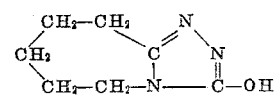

3.

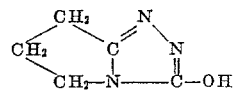

4.

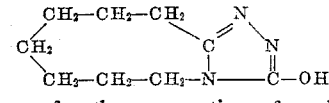

5. A process for the preparation of a chemical substance according to claim 1 which comprises reacting a cyclic lactim ether with a hydrazine carboxylic acid lower alkyl ester at about room temperature to about 80° C.

No references cited.